(12) United States Patent
Packes (10) Patent No.: US 10,785,358 B1
(45) Date of Patent: Sep. 22, 2020

(54) MOBILE DEVICE FINGER SUPPORT APPARATUS

(71) Applicant: James Packes, West Harrison, NY (US)

(72) Inventor: James Packes, West Harrison, NY (US)

( * ) Notice: Subject to any disclaimer, the term of this patent is extended or adjusted under 35 U.S.C. 154(b) by 0 days.

(21) Appl. No.: 16/773,295

(22) Filed: Jan. 27, 2020

Related U.S. Application Data (60) Provisional application No. 62/897,504, filed on Sep. 9, 2019.

(51) Int. Cl.
| H04M 1/04 | (2006.01) |
| G06F 1/16 | (2006.01) |
| H04B 1/3888 | (2015.01) |

(52) U.S. Cl.
CPC ............ *H04M 1/04* (2013.01); *G06F 1/1626* (2013.01); *G06F 1/1632* (2013.01); *H04B 1/3888* (2013.01); *A45F 2200/0516* (2013.01)

(58) Field of Classification Search
CPC .... A45F 2200/0516; A45F 2200/0525; H04M 1/04; G06F 1/1626; G06F 1/1632; H04B 1/3888; H04B 2001/3861
USPC ............................ 294/25, 167, 169; 224/929
See application file for complete search history.

(56) References Cited

U.S. PATENT DOCUMENTS

| 7,138,977 | B2 * | 11/2006 | Kinerk ................... G06F 1/1626 345/156 |
| 7,469,809 | B2 * | 12/2008 | Rodarte ................... G06F 1/163 224/578 |
| 8,640,867 | B2 * | 2/2014 | Szucs ..................... A45C 11/00 206/320 |
| 9,939,106 | B2 * | 4/2018 | Cheng ....................... A45F 5/10 |
| 10,277,725 | B2 | 4/2019 | Palacino |
| 2006/0054647 | A1 * | 3/2006 | Kathrein .................. A45C 1/04 224/183 |
| 2007/0018948 | A1 * | 1/2007 | Chen ..................... G06F 1/1616 345/156 |
| 2010/0018015 | A1 * | 1/2010 | Moore ..................... A45F 5/00 24/586.11 |
| 2014/0009409 | A1 * | 1/2014 | Wang ..................... G06F 3/041 345/173 |
| 2014/0117193 | A1 * | 5/2014 | Wong ..................... F16M 11/10 248/351 |
| 2014/0145958 | A1 * | 5/2014 | Zhang ................... G06F 1/1626 345/168 |
| 2017/0251088 | A1 * | 8/2017 | Rosales ..................... G06F 1/16 |
| 2019/0053613 | A1 |  2/2019 | Forutanpour |
| 2019/0212775 | A1 * | 7/2019 | Lalinde .................. A45C 13/22 |

\* cited by examiner

*Primary Examiner* — Dean J Kramer
(74) *Attorney, Agent, or Firm* — Dale J. Ream (57) ABSTRACT

A finger support apparatus for supporting a pinky finger during use of a smart phone includes a mounting portion configured to plug in or otherwise be inserted into a port of a smart phone case, the port being positioned along a bottom edge of the case. The finger support apparatus includes a body portion rotatably coupled to the mounting portion so as to be rotatably movable to an orientation desired by a user, i.e. to be optimally positioned depending on a user's preference in how the smart phone is held. The body portion may include a curved or ergonomic configuration to enhance grip of a user's finger and may have a tactile surface.

13 Claims, 10 Drawing Sheets

MOBILE DEVICE FINGER SUPPORT APPARATUS

REFERENCE TO RELATED APPLICATIONS

This application claims the priority of provisional patent application U.S. Ser. No. 62/897,504 filed Sep. 9, 2019 titled Mobile Device Finger Support Apparatus and which is incorporated in its entirety herein by reference.

BACKGROUND OF THE INVENTION

This invention relates generally to an accessory to a mobile computing device and, more particularly, to an apparatus that may be removably coupled to a bottom edge of a smart phone and configured for supporting the pinky finger of a person holding the case of the smart phone.

Smart phones have evolved to include very advanced technology, including cameras, large capacity batteries, large screens, and video capabilities. In reality, smart phones are like carrying a full laptop computer in a user's hand and can be heavy and awkward. Computers, however, have always been heavy and have often been carried in bags with handles or even with over-the-shoulder straps. Therefore, the weight of an electronic device is not new. The problem, now, is that many of the functions provided by a smart phone are accessed by a user pushing an icon or alphanumeric representation of a letter that appears on the screen of the mobile computing device, e.g. smart phone. Put simply, smart phones use touch screen technology as the primary input source. Users frequently hold the smart phone in one hand—grasped on the side edges by a thumb and fingers and supported by the pinky finger of that hand, and then the user pushes the touch screen letters to form a text message. Following this same procedure dozens or even hundreds of times a day often results in actual medical damage to the user's pinky finger—sometimes becoming so severe as to require medical attention as is now apparent in the news literature.

Therefore, it would be desirable to have a finger support apparatus that plugs into a battery port or headphone jack port frequently found on the bottom edge of a smart phone case, the finger support apparatus configured to support a pinky finger of a smart phone user. Further, it would be desirable to have a finger support apparatus that is ergonomically shaped, such as curved, to receive a user's pinky finger. In addition, it would be desirable to have a finger support apparatus that includes a mounting portion that plugs into a smart phone port and a body portion rotatably coupled to the mounting portion that is rotatably adjustable to an orientation chosen by the user.

SUMMARY OF THE INVENTION

A finger support apparatus according to the present invention for use with a handheld computing device such as a smart phone includes a mounting portion having an inlet plug configured for insertion into the accessory port of the handheld computing device, said mounting portion having a fixed configuration that defines a longitudinal axis extending longitudinally away from the handheld computing device. The finger support apparatus includes a body portion coupled to the mounting portion and extending away from the lower frame portion, said body portion being configured to rotate axially about said longitudinal axis. The body portion may include a proximal edge adjacent said mounting portion, a distal edge opposite said proximal edge, and a pair of laterally opposed side edges extending between said proximal and distal edges. The finger support apparatus may include a keychain configured to mount to the finger support apparatus for storage and transport.

A general object of this invention is to provide a finger support apparatus for supporting the pinky finger of a user of a handheld mobile computing device during one-handed user.

Another object of this invention is to provide a finger support apparatus, as aforesaid, that plugs into a port in a bottom edge of the computing device and which rotates to an orientation as desired by a user.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is a pair of isolated views showing two orientations of the finger support apparatus as in FIG. 1a;

FIG. 1d is an exploded view of the finger support apparatus as in FIG. 1a;

FIG. 2b is a pair of isolated views showing two orientations of the finger support apparatus as in FIG. 2a;

FIG. 3b is a pair of isolated views showing two orientations of the finger support apparatus as in FIG. 3a;

FIG. 4b is a pair of isolated views showing two orientations of the finger support apparatus as in FIG. 4a;

DESCRIPTION OF THE PREFERRED EMBODIMENT

A finger support apparatus according to the present invention will be described with reference to FIGS. 1a to 5b of the accompanying drawings. The finger support apparatus 10 may include a mounting portion 20 configured to plug-in or otherwise be inserted into a port 14 along a bottom edge of a case of a mobile computing device 12, such as a cell phone or smart phone of a type that is usually held by a single hand of a user. More particularly, the mounting portion 20 may include a plug 22 having a configuration complementary to that of the port of the mobile device, e.g. in the form of a USB, mini-USB, headphone jack, rechargeable battery jack, RCA connection, or the like.

The finger support apparatus 10 includes a body portion 30 rotatably coupled to the mounting portion 20 so that the orientation thereof may be adjusted by a user. It is understood that this rotational functionality (which may be referred to as a rotational swivel) may be accomplished by the body portion 30 having a rod, nub, or plug extending from a proximal edge thereof and the mounting portion 20 defining a bore configured to receive the nub or rod therein (not shown). The body portion 30 may have a curved shape like the trigger of a firearm or, alternatively, have more of a square, round, or teardrop shape. Preferably, a top face of the body portion 30 may have a tactile surface 32, whether defining a groove or having a coarse, rubbery, or sticky surface operable to frictionally receive, nest, and hold a finger surface of a user. At least the top face or, in some embodiments the entire body portion 30, may exhibit a curved or slightly concave configuration so as to better receive a user's finger thereon. Multiple variations, showing the variations described above, are included in this application but all have substantially the same functionality.

Now, with greater detail, the body portion 30 may include a proximal edge 34 rotatably coupled to the mounting portion 20 and a distal edge 36 opposite the proximal edge 34, the distal edge 36 being displaced from and positioned outwardly away from the mounting portion 20. A pair of laterally opposed side edge 38 extends between the proximal edge 34 and distal edge 36, respectively. Together, these edges define the variations in the possible configurations shown in the drawings. Primed numerals will be used to clarify otherwise similar components.

For instance, in an embodiment shown in FIGS. 1a to 1d, the proximal edge 34a of the body portion 30 has a straight line or linear configuration defining a first length. Further, the distal edge 36a also has a linear configuration and is parallel to the proximal edge 34a, the distal edge 36a defining a second length that is shorter than the first length of the proximal edge 34a. As such, the lateral side edges 38a slope inwardly and toward one another as they extend from the proximal edge 34a toward the distal edge 36a. In other words, the body portion 30 may have a generally trapezoidal shape configuration with the proximal edge being the longer edge and the distal edge being the shorter edge.

Figure 1A:
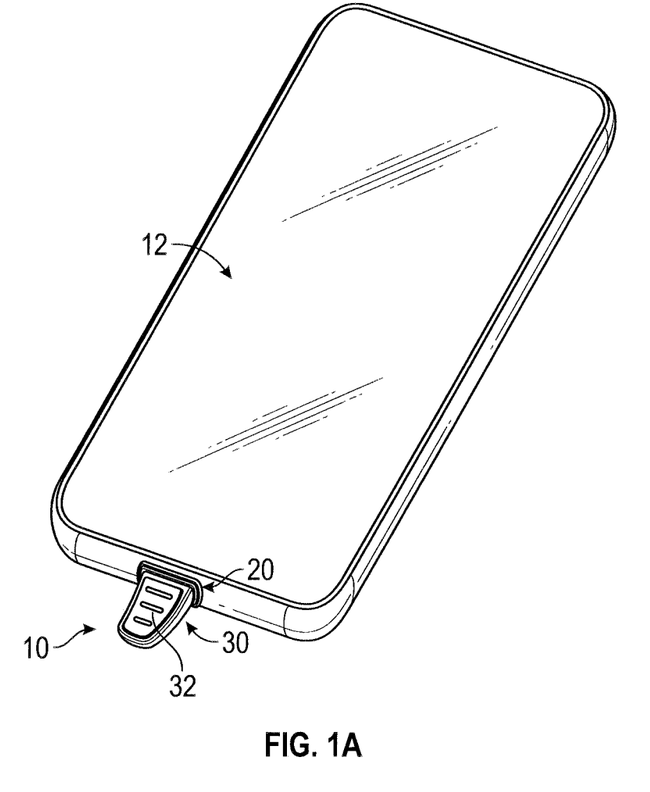
FIG. 1a is a perspective view of a finger support apparatus according to an embodiment of the present invention, illustrated coupled to a handheld smart phone.
Figure 1B:
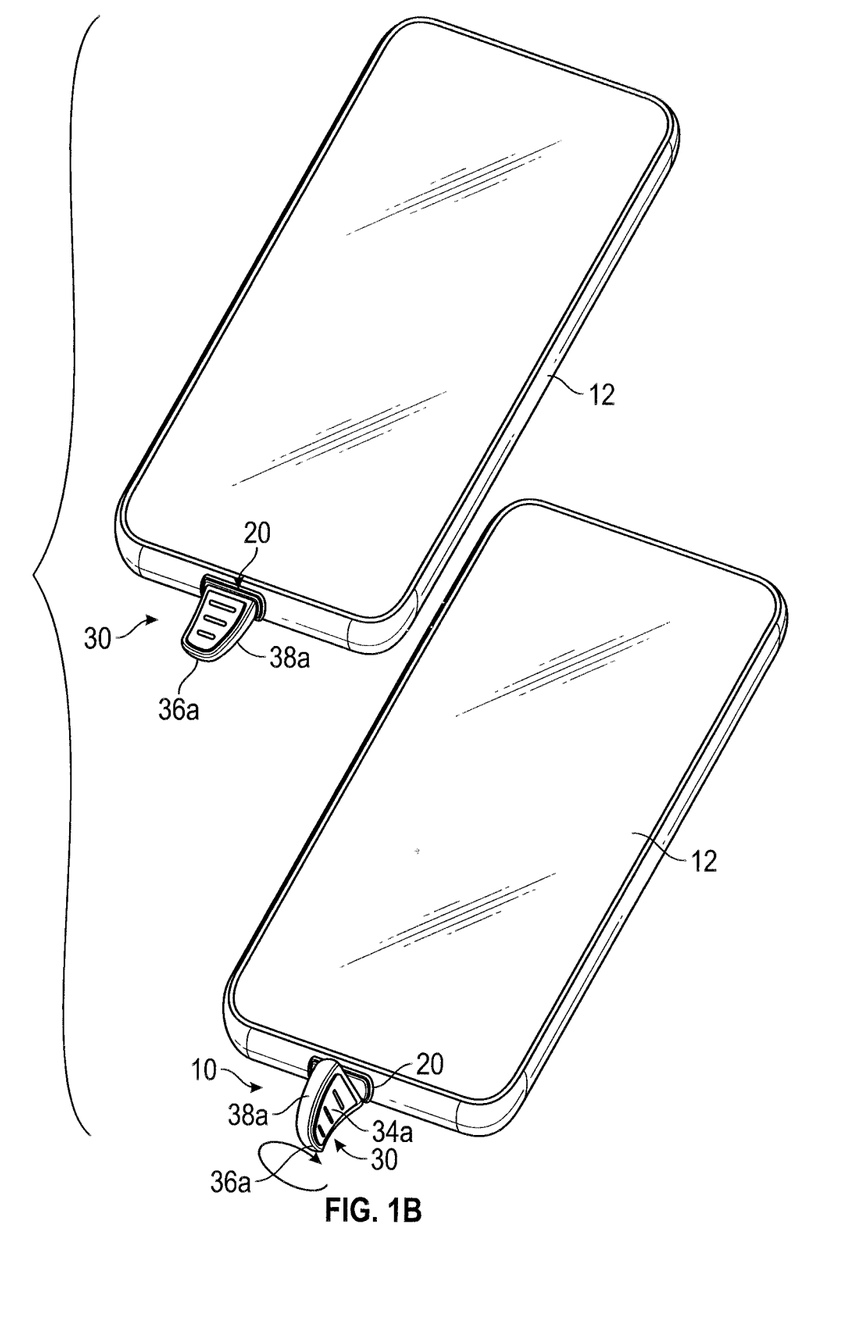
Figure 1C:
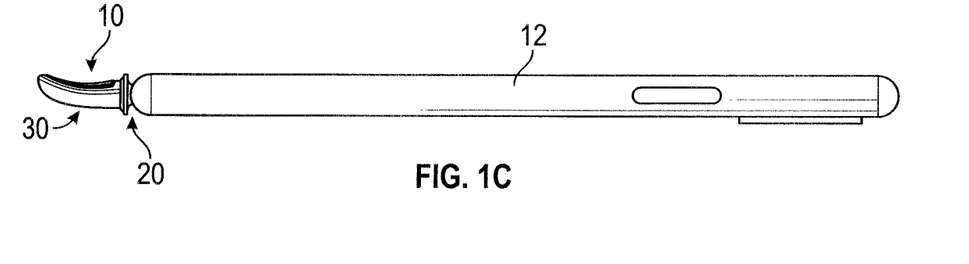
FIG. 1c is a side view of the finger support apparatus as in FIG. 1.
Figure 1D:
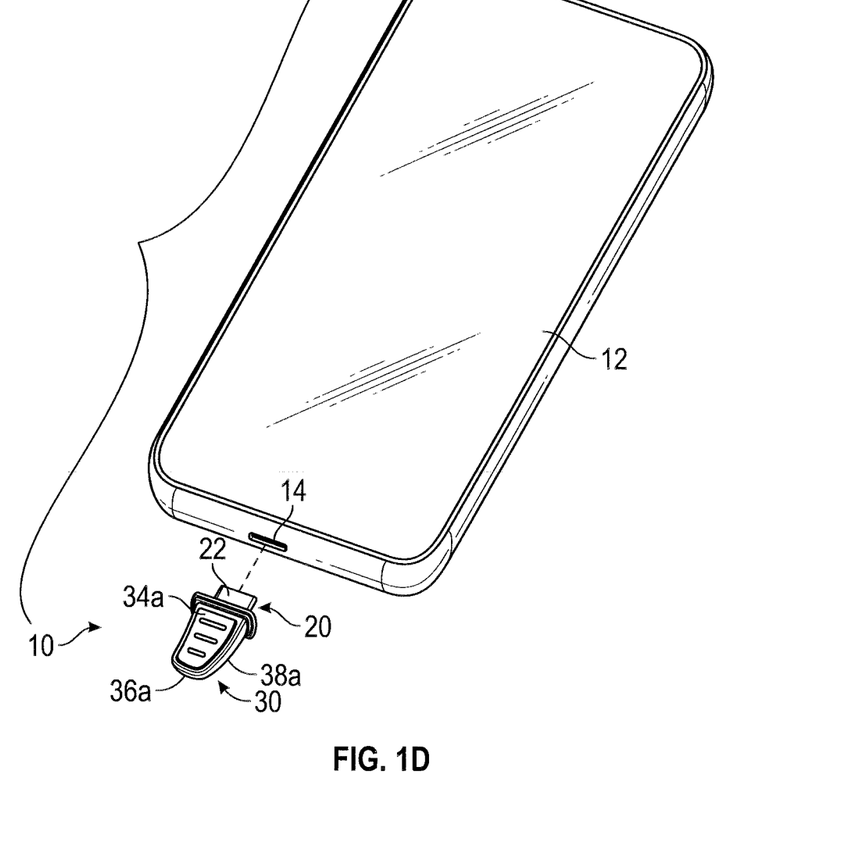
Figure 2A:
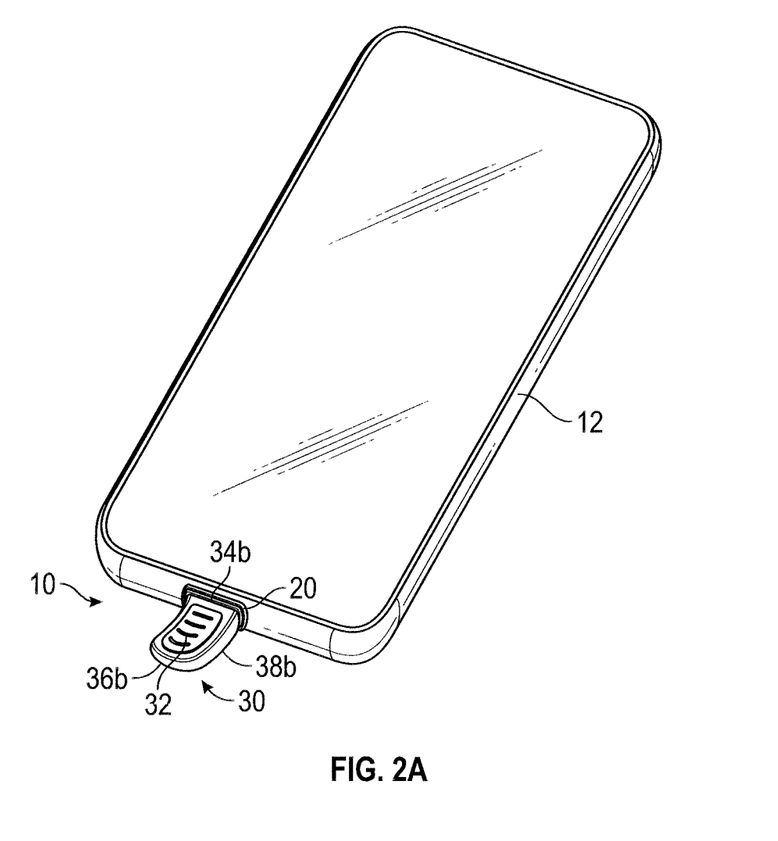
FIG. 2a is a perspective view of the finger support apparatus according to a variation of the of the finger support apparatus according to the present invention.
Figure 2B:
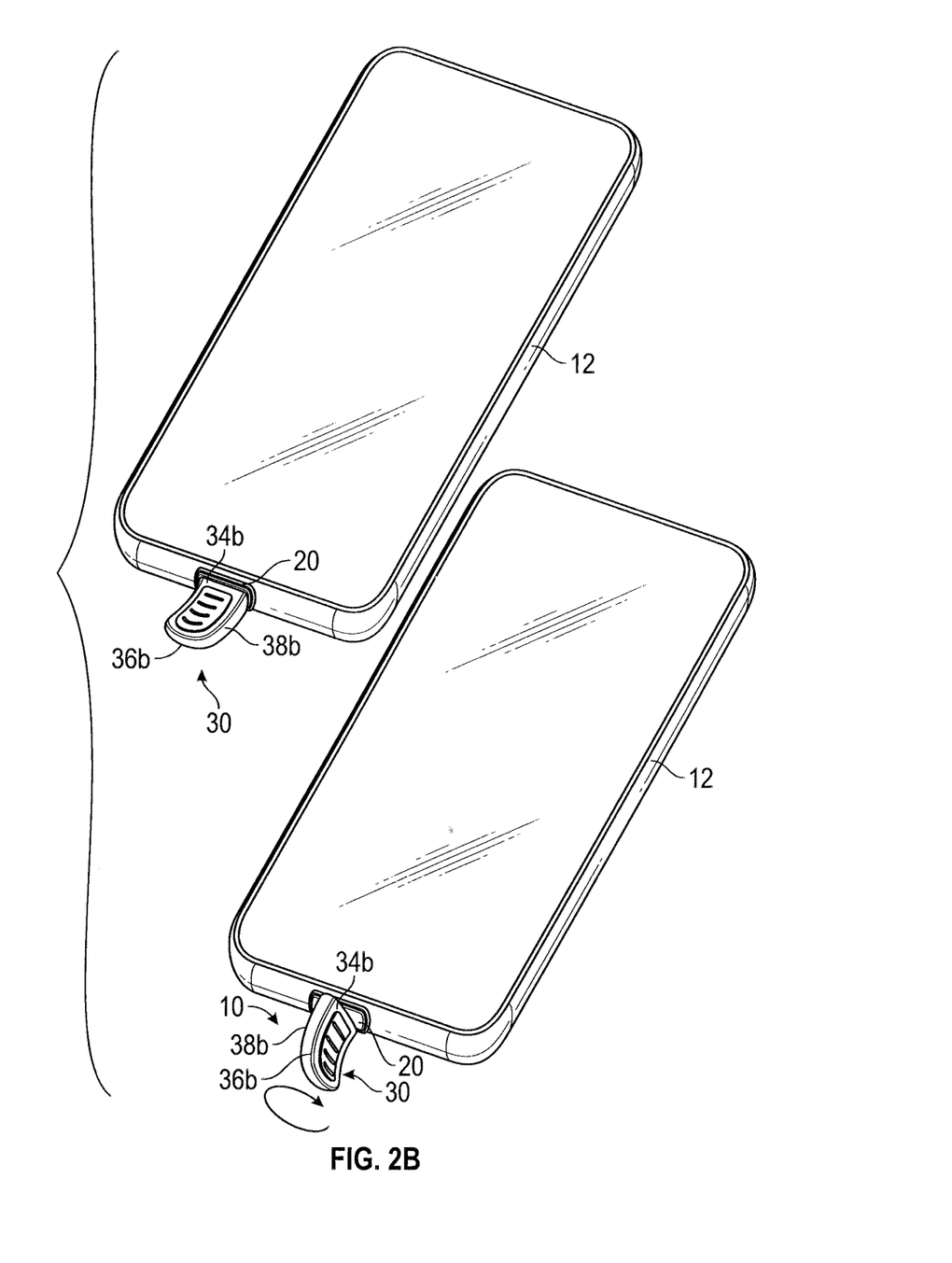

In a variation, shown in FIGS. 2a to 2b, the proximal edge 34b and distal edge 36b have linear configurations and having an equal length. Similarly, the pair of lateral side edges 38b having linear configuration and also define an equal length such that the body portion 30 has a generally square configuration.

Figure 3A:
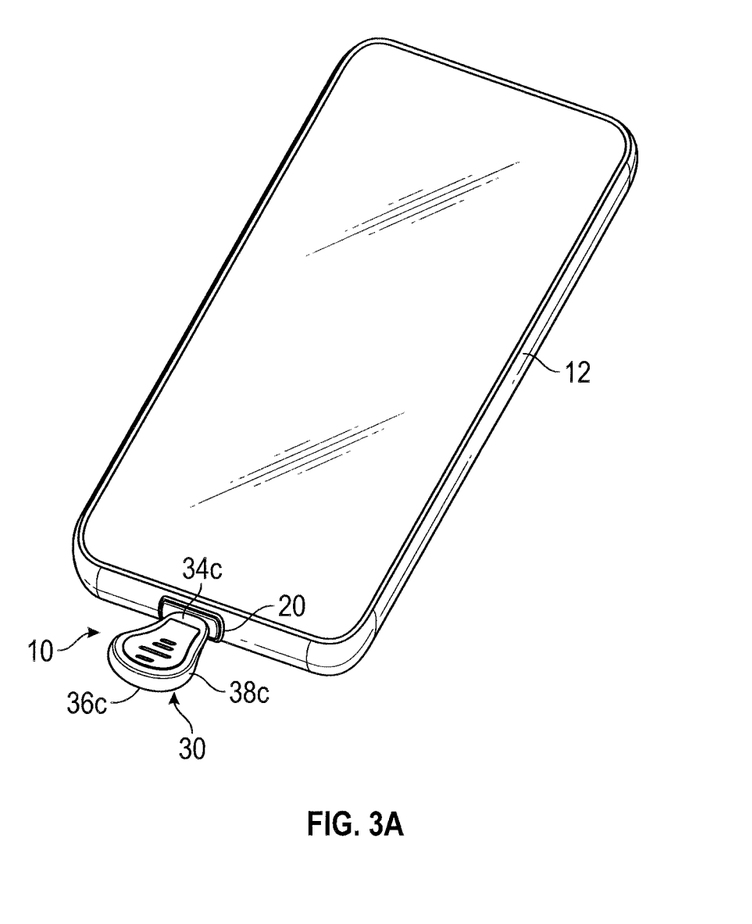
FIG. 3a is a perspective view of the finger support apparatus according to a variation of the of the finger support apparatus according to the present invention.
Figure 3B:
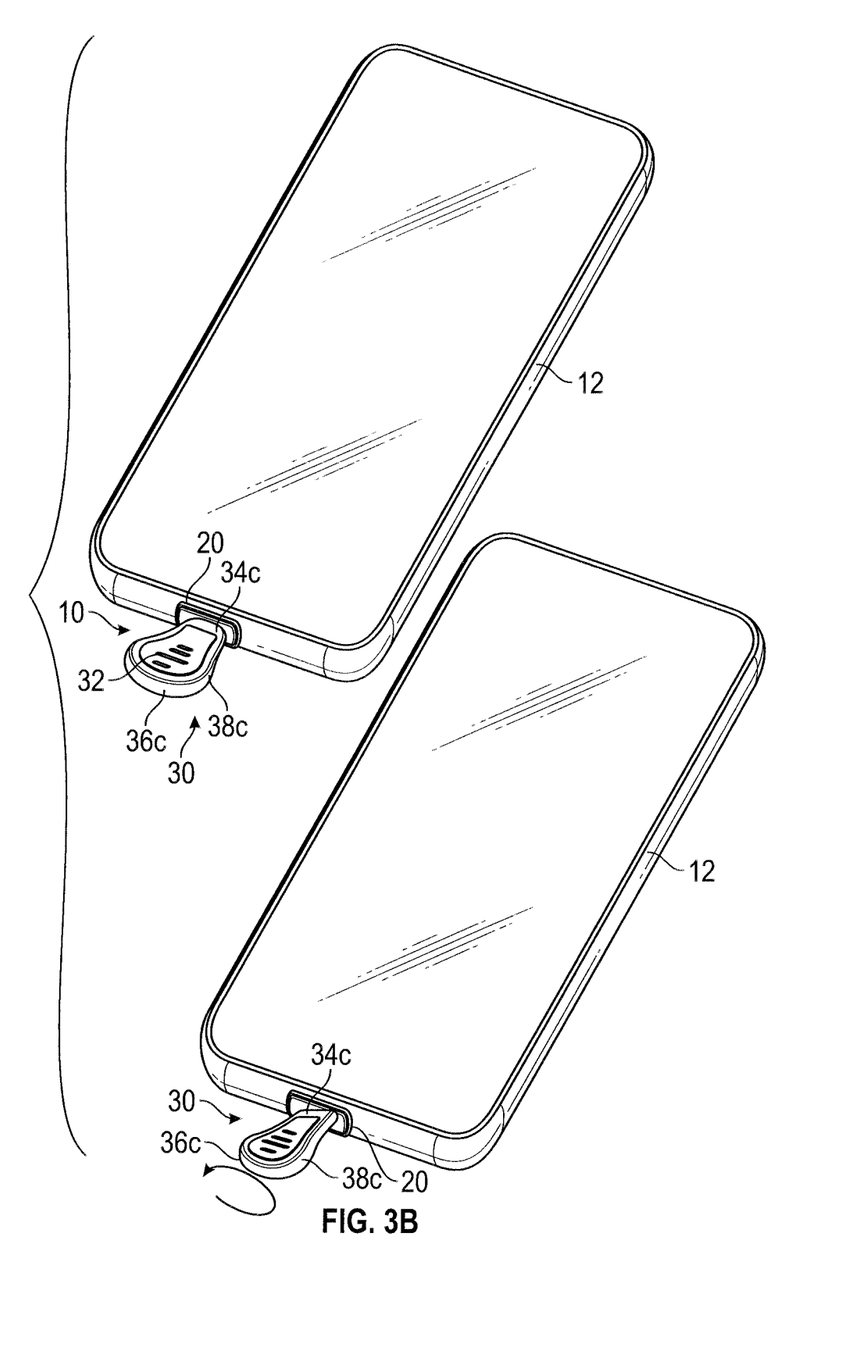

In another variation, shown in FIGS. 3a to 3b, the proximal edge 34c of the body portion 30 has a straight line or linear configuration defining a first length. Further, the distal edge 36c also has a linear configuration and is parallel to the proximal edge 34c, the distal edge 36c defining a second length that is longer than the first length of the proximal edge 34c. As shown, however, the proximal and distal edges in this configuration may be slightly rounded or curved. Further, each side edge 38c has a curvilinear configuration (i.e. curved and not straight). As such, the lateral side edges 38c slope in a gentle curve toward one another as they extend from the distal edge 36c toward the proximal edge 34c. In other words, the body portion 30 may have a generally trapezoidal shape configuration with the distal edge being the longer edge and the proximal edge being the shorter edge.

Figure 4A:
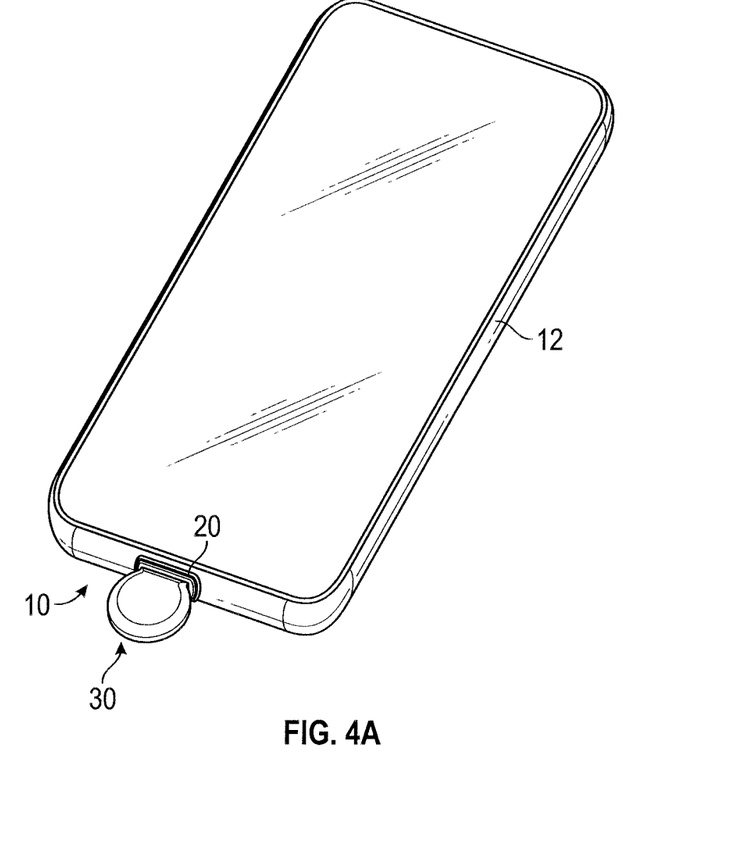
FIG. 4a is a perspective view of the finger support apparatus according to a variation of the of the finger support apparatus according to the present invention.
Figure 4B:
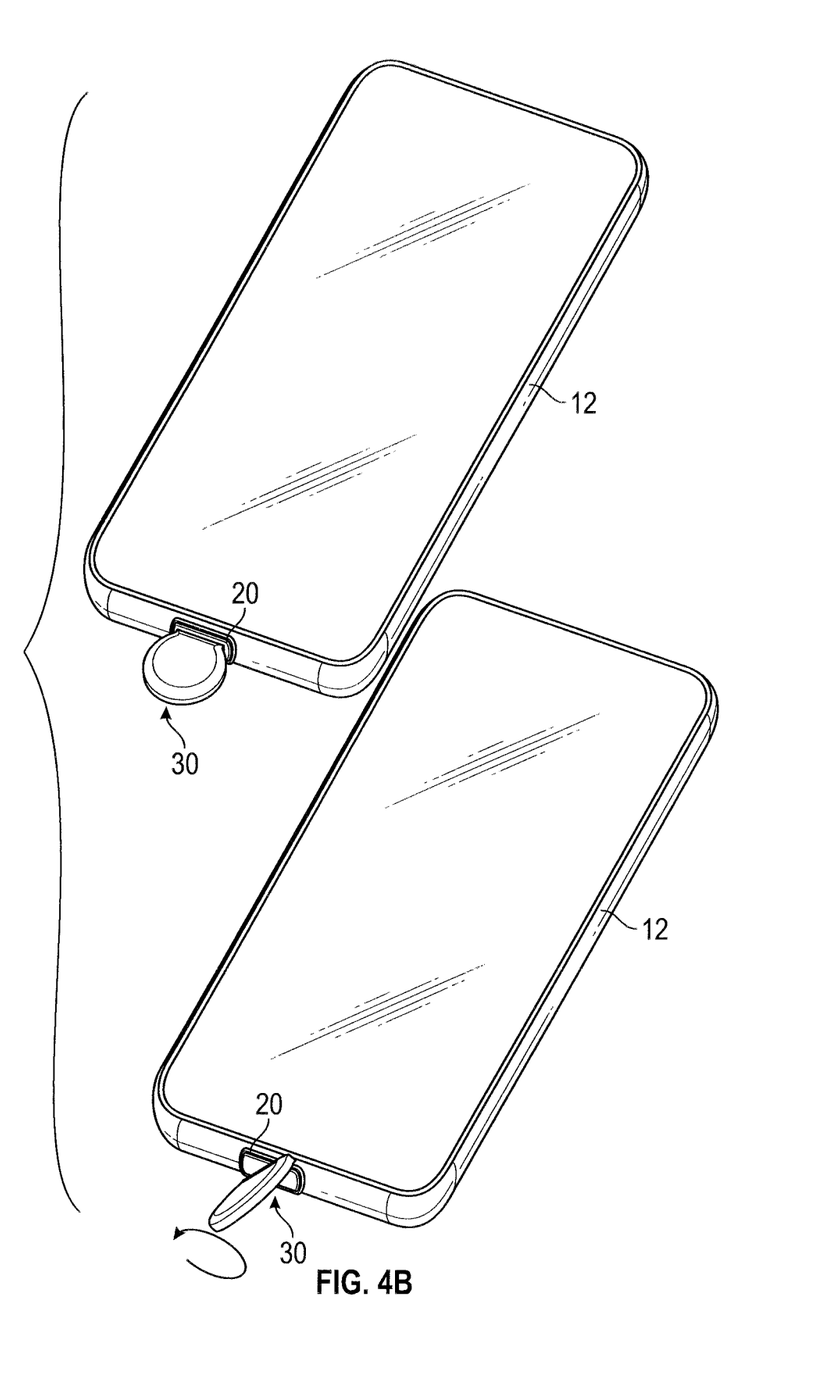

In still another variation, the body portion 30 has a generally circular configuration as shown in FIGS. 4a to 4b. In other words, the proximal, distal, and side edges are together arranged such that a peripheral edge of the body portion 30 has a circular shape configuration.

Figure 5A:
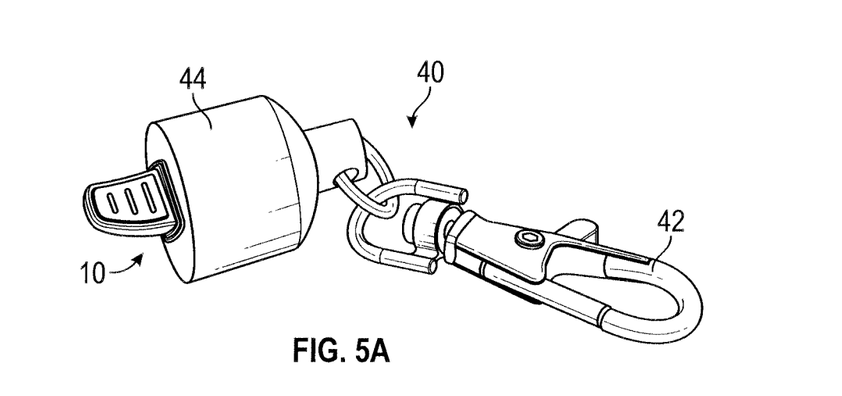
FIG. 5a is a perspective view of a keychain for use in docking the finger support apparatus, illustrated in a docked configuration.
Figure 5B:
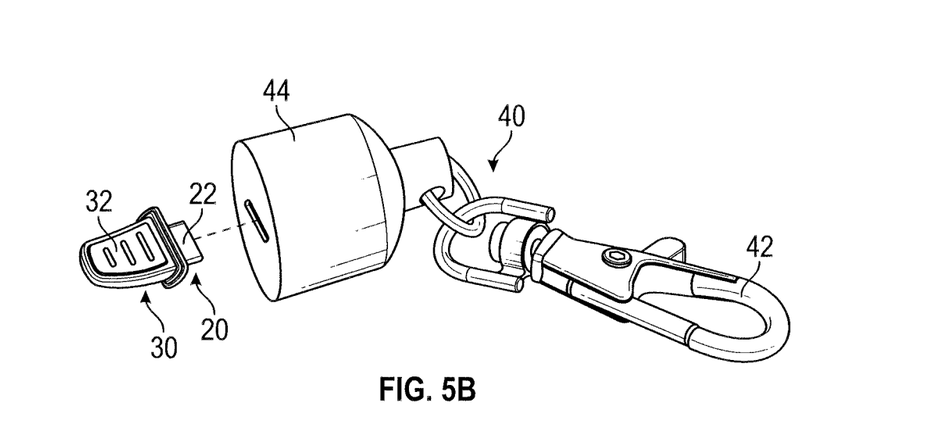
FIG. 5b is a perspective view of the keychain as in FIG. 5a, illustrated in a released configuration.

In another aspect, the present invention may include a keychain 40 specifically configured to receive and hold the finger support apparatus 10 when not otherwise coupled to the smart phone (FIGS. 5a and 5b). More particularly, the keychain 40 may include a fastener 42 configured to couple the keychain 40 to another object, such as to a belt loop, backpack strap, briefcase handle, vehicle key ring, or the like. In an embodiment, the fastener 42 may be a carabiner although other quick connect fasteners would work. Further, the keychain 40 may include a dock member 44 opposite the fastener 42 that defines a docking port having a configuration complementary a configuration of the mounting portion 20 of the finger support apparatus 10. Accordingly, a user can keep the mounting portion 20 of the finger support apparatus 10 connected to the keychain 40 for storage, transport, and the like and, then when needed, release it from the dock member 44 of the keychain 40 and plug it into the smart phone case. Keeping the finger support apparatus 10 joined to the keychain 40 is primarily to prevent theft, misplacement, or damage.

In use, the finger support apparatus 10 may at first be carried on the keychain 40 as described above, e.g. for transport or storage. But, when desired, the finger support apparatus 10 may be released from the keychain 40 and the mounting portion 20 may be inserted into a port 14 of a mobile computing device 12, e.g. a smart phone. The body portion 30 may be rotated relative to the mounting portion 20 as may be most comfortable and desirable to the user. Accordingly, the pinky finger of the user may be positioned on and supported atop the top face of the body portion 30 as the mobile device is held by a single hand of the user.

It is understood that while certain forms of this invention have been illustrated and described, it is not limited thereto except insofar as such limitations are included in the following claims and allowable functional equivalents thereof.

The invention claimed is:

1. A finger support apparatus for a handheld computing device of a type that includes a case having one of a battery port or an accessory port along a lower frame portion, said finger support apparatus, comprising:

a mounting portion having an inlet plug configured for insertion into the accessory port of the handheld computing device, said mounting portion having a fixed configuration that defines a longitudinal axis extending longitudinally away from the handheld computing device;

a body portion coupled to the mounting portion and extending away from the lower frame portion, said body portion being configured to rotate axially about said longitudinal axis;

wherein said body portion includes a proximal edge adjacent said mounting portion, a distal edge opposite said proximal edge, and a pair of laterally opposed side edges extending between said proximal and distal edges;

said proximal edge has a linear configuration defining a first length;

said distal edge has a linear configuration defining a second length that is shorter than said first length such that said pair of laterally opposed side edges slope inwardly toward one another between said proximal and distal edges, respectively.

2. The finger support apparatus as claim 1, wherein said body portion includes a front face and a rear face opposite said front face, said front face having a tactile surface.

3. The finger support apparatus as in claim 2, wherein said body portion has a concave configuration relative to said front face for receiving a user's finger.

4. The finger support apparatus as in claim 1, wherein said body portion has a trapezoidal shape configuration.

5. The finger support apparatus as in claim 1, further comprising:
a keychain having a fastener portion releasably coupled to a dock member, wherein:
said fastener portion includes a metal loop having an operable gate configured for releasable attachment to an object;
said dock member having a docking port having a shape configuration releasably receiving said mounting portion of said finger support apparatus.

6. The finger support apparatus as in claim 5, wherein said fastener portion is a carabiner.

7. A finger support apparatus for a handheld computing device of a type that includes a case having one of a battery port or an accessory port along a lower frame portion, said finger support apparatus, comprising:
a mounting portion having an inlet plug configured for insertion into the accessory port of the handheld computing device, said mounting portion having a fixed configuration that defines a longitudinal axis extending longitudinally away from the handheld computing device;
a body portion coupled to the mounting portion and extending away from the lower frame portion, said body portion being configured to rotate axially about said longitudinal axis;
wherein said body portion includes a proximal edge adjacent said mounting portion, a distal edge opposite said proximal edge, and a pair of laterally opposed side edges extending between said proximal and distal edges;
wherein said proximal edge has a linear configuration defining a first length;
wherein said distal edge has a rounded configuration defining a second length that is longer than said first length such that said pair of laterally opposed side edges slope outwardly from one another between said proximal and distal edges, respectively.

8. The finger support apparatus as in claim 7, wherein each one of said pair of laterally opposed side edges have a curvilinear configuration extending between said proximal and distal edges.

9. The finger support apparatus as in claim 7, wherein said body portion includes a front face and a rear face opposite said front face, said front face having a tactile surface.

10. A finger support apparatus for a handheld computing device of a type that includes a case having one of a battery port or an accessory port along a lower frame portion, said finger support apparatus, comprising:
a mounting portion having an inlet plug configured for insertion into the accessory port of the handheld computing device, said mounting portion having a fixed configuration that defines a longitudinal axis extending longitudinally away from the handheld computing device;
a body portion coupled to the mounting portion and extending away from the lower frame portion, said body portion being configured to rotate axially about said longitudinal axis; and
a keychain having a fastener portion that includes a metal loop having an operable gate configured for releasable attachment to an object,
said keychain having a dock member that includes a docking port having a shape configuration releasably receiving said mounting portion of said finger support apparatus;
wherein said body portion includes a proximal edge adjacent said mounting portion, a distal edge opposite said proximal edge, and a pair of laterally opposed side edges extending between said proximal and distal edges.

11. The finger support apparatus as in claim 10, wherein:
said proximal edge has a linear configuration defining a first length;
said distal edge has a linear configuration defining a second length that is shorter than said first length such that said pair of laterally opposed side edges slope inwardly toward one another between said proximal and distal edges, respectively.

12. The finger support apparatus as in claim 10, wherein said body portion includes a front face and a rear face opposite said front face, said front face having a tactile surface.

13. The finger support apparatus as in claim 10, wherein said body portion has a concave configuration for nesting a user's finger on said front face.

\* \* \* \* \*